United States Patent [19]

Aaker et al.

[11] Patent Number: 5,815,516

[45] Date of Patent: *Sep. 29, 1998

[54] METHOD AND APPARATUS FOR PRODUCING TRANSMISSION CONTROL PROTOCOL CHECKSUMS USING INTERNET PROTOCOL FRAGMENTATION

[75] Inventors: Kenneth Dale Aaker; Gary Scott Delp; Lee Anton Sendelbach, all of Rochester; Albert Alfonse Slane, Oronoco, all of Minn.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 628,826

[22] Filed: Apr. 5, 1996

[51] Int. Cl.$^6$ .......................... H03M 13/00; H01J 13/00
[52] U.S. Cl. .................. 371/53; 395/200.66; 395/200.76
[58] Field of Search .............................. 371/53, 48, 37.1, 371/37.5, 37.7, 2.1, 2.2, 37.01, 37.02, 37.03, 49; 364/265, 265.1, 265.3, 266, 266.3, 942.9, 944.5, 240.8; 370/392, 428, 429, 470, 471, 472, 473, 474; 395/185.01, 185.05, 200.18, 200.17, 183.15, 200.6, 200.64, 200.61, 200.66, 200.68, 200.75, 200.76

[56] References Cited

U.S. PATENT DOCUMENTS

| | | | |
|---|---|---|---|
| 4,493,021 | 1/1985 | Agrawal et al. | 395/200.66 |
| 4,639,921 | 1/1987 | Gang et al. | 371/53 |
| 5,058,110 | 10/1991 | Beach et al. | 371/37.7 |
| 5,430,842 | 7/1995 | Thompson et al. | 395/200.66 |
| 5,444,709 | 8/1995 | Riddle | 370/474 |
| 5,500,864 | 3/1996 | Gonia et al. | 371/53 |
| 5,522,039 | 5/1996 | Snyder et al. | 395/185.05 |
| 5,541,920 | 7/1996 | Angle et al. | 370/429 |

OTHER PUBLICATIONS

Driscoll et al., Serial Network Overlapped Block Check Generation and Checking, Sep. 1991, IBM Research Disclosure n329 09–91, Order #91A 62520 pp. 1–3.

MacLean et al., Redundant CRC Circuits for Verifying Data Processed Through Parallel Data Processors, Mar. 1990, IBM Research Disclosure, pp. 1–3, Order #:90A 61114.

Postel, J.(ed), "Internet Protocol–DARPA Internet Program Protocol Specification", RFC 791, USC/Information Sciences Institute, Sep. 1981.

"Transmission Control Protocol–DARPA Internet Program Protocol Specification", RFC 793, USC/Information Sciences Institute, Sep. 1981.

Leffler, Samuel J. and Karels, Michael J., "Trailer Encapsulations", RFC 893, University of California at Berkeley, USC/Information Sciences Institute, Apr. 1984.

*Primary Examiner*—Trinh L. Tu
*Attorney, Agent, or Firm*—Joan Pennington

[57] ABSTRACT

An improved method and apparatus are provided for producing transmission control protocol (TCP) checksums using internet protocol (IP) fragmentation. A transmission control protocol module receives packet data to be transmitted and prepares a first internet protocol data fragment without a checksum for the received packet data. The first internet protocol data fragment is transmitted. Collecting checksum is performed during the transmission of the first internet protocol data fragment. Then an internet protocol header fragment including the collected checksum is transmitted.

15 Claims, 7 Drawing Sheets

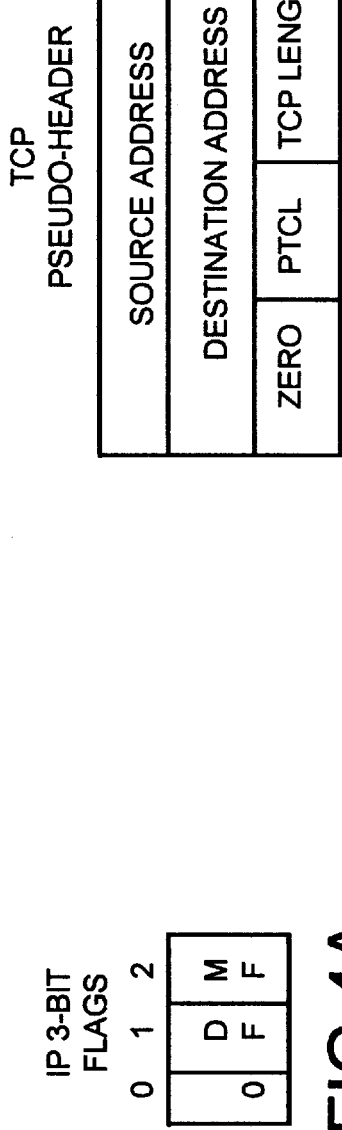
FIG.4B
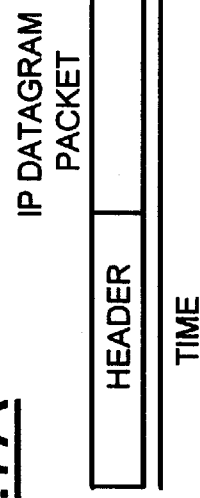
FIG.4A
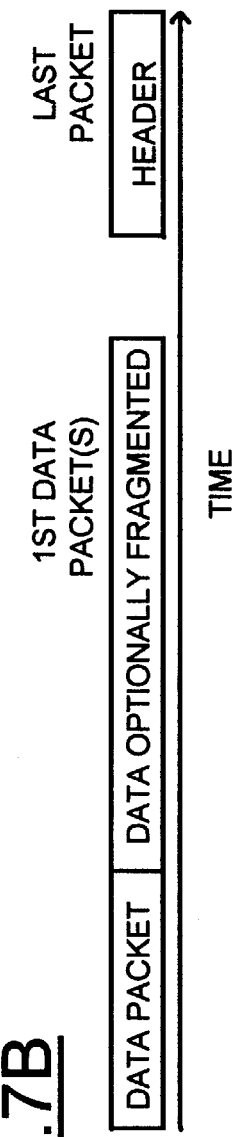
FIG.7A
FIG.7B

| VERSION | IHL | TYPE OF SERVICE | TOTAL LENGTH=L-20 | |
|---|---|---|---|---|
| IDENTIFICATION X | | | FLAGS 0 1 0 | FRAG. OFFSET 20 |
| TIME TO LIVE | | PROTOCOL | HEADER CHECKSUM | |
| SOURCE ADDRESS | | | | |
| DESTINATION ADDRESS | | | | |
| DATA *** DATA | | | | |

DATA FRAGMENT(S) TRANSMITTED FIRST

FIG.5

| VERSION | IHL | TYPE OF SERVICE | TOTAL LENGTH=40 | |
|---|---|---|---|---|
| IDENTIFICATION SAME X | | | FLAGS 0 1 1 | FRAG. OFFSET 0 |
| TIME TO LIVE | | PROTOCOL | HEADER CHECKSUM | |
| SOURCE ADDRESS | | | | |
| DESTINATION ADDRESS | | | | |
| SOURCE PORT | | | DESTINATION PORT | |
| SEQUENCE NUMBER | | | | |
| ACKNOWLEDGMENT NUMBER | | | | |
| DATA OFFSET | RESERVED | URG ACK PSH RST SYN FIN | WINDOW | |
| CHECK SUM | | | URGENT POINTER | |

HEADER FRAGMENT TRANSMITTED LAST

FIG.6

METHOD AND APPARATUS FOR PRODUCING TRANSMISSION CONTROL PROTOCOL CHECKSUMS USING INTERNET PROTOCOL FRAGMENTATION

FIELD OF THE INVENTION

The present invention relates to a packet communication network, and more particularly to a method and apparatus for producing transmission control protocol (TCP) checksums using internet protocol (IP) fragmentation.

DESCRIPTION OF THE PRIOR ART

Packets transmitted across a communications network between nodes contain data and a header that describes the data. Typically, such as with known communication systems utilizing an internet protocol (IP), a sending computer or node sends the header first and then the data. In any communication system, it is desirable to detect data transmission errors. The header contains, among other things, a checksum, which the sending node generates by examining the data and the receiving node uses for error checking to determine if any errors were introduced into the data during transmission. In order to generate the header, the sending mode must read all the data. This usually requires the sending node to examine every byte of the data twice, once to generate the checksum and then again to send the data.

The internet protocol (IP) has been defined to provide for transmitting blocks of data called internet datagrams from sources to destinations, where sources and destinations are hosts identified by fixed length addresses. The internet datagram is a unit of data including an internet header exchanged between the source and destination internet computer systems. The internet protocol implements two basic functions of addressing and fragmentation. The internet protocol is specifically limited in scope to provide the functions necessary to deliver a package of bits, the internet datagram, from a source to a destination over an interconnected system of networks. The IP provides no mechanisms to augment end-to-end data reliability, flow control, sequencing, or other services commonly found in host-to-host protocols. Typically another host-to-host protocol layer, such as, the transmission communication protocol (TCP) is used with the IP for these functions.

For example, a TCP module calls on the IP module to transmit user data and a TCP header in the internet datagram. The TCP module provides the source and destination addresses and other parameters in an internet header to the internet module as arguments of the call. The IP module then creates an internet datagram and a call on the local network interface to transmit the internet datagram.

The internet protocol provides for fragmentation and reassembly of long datagrams for transmission through small packet networks. An internet protocol modules use predetermined fields in the internet protocol header to fragment and reassemble internet datagrams. The internet protocol module resides in each host engaged in internet communication. The internet protocol modules share common rules for interpreting address fields and for fragmenting and assembling internet datagrams.

The transmission communication protocol (TCP) uses a checksum to protect the data which is transmitted. This checksum is located in the TCP header of the internet datagram packet. As described above, all of the data must be examined before the beginning of the data can be transmitted. This results in two adverse consequences. First, all of the bytes of data must be read twice, once to collect the checksum, and once to transmit the data. This cuts down the maximum throughput possible for this protocol. Second, the beginning of the data cannot be transmitted until the end of the data is known. This adds to the latency.

RFC 893, entitled "Trailer Encapsulations", by Samuel J. Leffler and Michael J. Karels, University of California at Berkeley, April, 1984 discusses the motivation for use of "trailer encapsulations" on local-area networks and describes the implementation of such an encapsulation on various media. The use of trailer encapsulations requires that the receiving host or node must be willing to accept trailers. As a link level encapsulation, unless a host to host negotiation is performed, only certain hosts will be able to converse, or their communication may be significantly impaired if trailer packets are mixed with non-trailer packets.

As used in the following description and claims, transmission communication protocol (TCP) means any host-to-host protocol used with the internet protocol that generates a header checksum for an internet datagram. The term transmission communication protocol or TCP should be understood to specifically include the user datagram protocol (UDP).

A need exists for improved method and apparatus for producing transmission control protocol (TCP) checksums that enables transmission of the checksum at the end of the data packet while maintaining the conventional internet datagram structure and that is simple to implement without requiring architectural change or modification to the internet protocol.

SUMMARY OF THE INVENTION

A principal object of the present invention is to provide an improved method and apparatus for producing transmission control protocol (TCP) checksums using internet protocol (IP) fragmentation.

In brief, an improved method and apparatus are provided for producing transmission control protocol (TCP) checksums using internet protocol (IP) fragmentation. A transmission control protocol module receives packet data to be transmitted and prepares a first internet protocol data fragment without a checksum for the received packet data. The first internet protocol data fragment is transmitted. Collecting checksum is performed during the transmission of the first internet protocol data fragment. Then an internet protocol header fragment including the collected checksum is transmitted.

BRIEF DESCRIPTION OF THE DRAWINGS

The present invention together with the above and other objects and advantages may best be understood from the following detailed description of the preferred embodiments of the invention illustrated in the drawings, wherein:

FIG. 4A is a block diagram representation illustrating an IP header flags field of the an internet protocol (IP) datagram or packet;

FIG. 4B is a block diagram representation illustrating a TCP pseudo header included in a checksum calculation that is transferred in the arguments or results of calls by a transmission control protocol (TCP) module on an internet protocol (IP) module;

FIG. 5 is a block diagram representation illustrating a first internet protocol (IP) data datagram fragment including an IP header and data in accordance with the invention;

FIG. 6 is a block diagram representation illustrating a second internet protocol (IP) header datagram fragment including an IP header and a TCP header in accordance with the invention;

FIG. 7A is a chart illustrating a conventional IP packet or internet datagram transmission; and FIG. 7B is a chart illustrating the IP packet or internet datagram fragment transmission method in accordance with the invention.

DETAILED DESCRIPTION OF THE PREFERRED EMBODIMENTS

Figure 1:
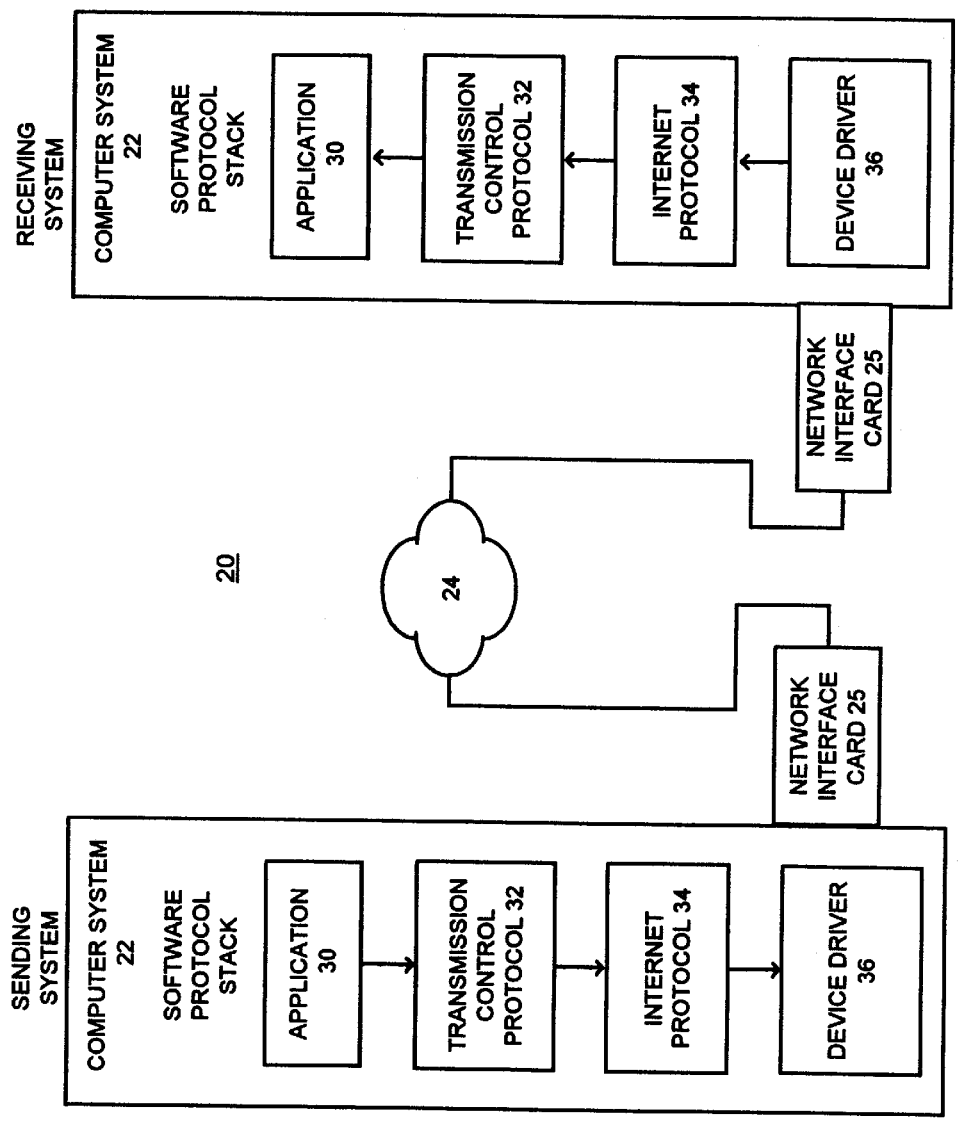
FIG. 1 is a block diagram representation illustrating a packet communication network system in accordance with the invention.

Having reference now to the drawings, in FIG. 1 there is shown a block diagram representation illustrating a packet communication network system generally designated by the reference character 20 which may be employed to implement the method of the present invention. As shown, the packet communication system 20 includes a sending computer system 22 and a receiving computer system 22, each connected to a packet communication network or internet 24 by a network interface card 25. The sending and receiving computer systems 22 include an operating system software protocol stack including an application module 30, a transmission control protocol (TCP) module 32, an internet protocol (IP) module 34 and a device driver 36. An application 30 accesses the TCP 32 in the sending computer system 22. The TCP module 32 calls on the internet protocol (IP) module 34 which in turn calls on the device driver 36. The TCP module 32 may call on other operating system functions, for example, to manage data structures. The interface to the network 24 is controlled by the device driver module 36. In the receiving computer system 22, the internet protocol (IP) module 34 receives and reassembles a fragmented internet datagram from the device driver 36 and passes the internet datagram up to the TCP module 32.

In accordance with an important feature of the invention, the conventional order of an internet datagram transmission is reversed or reordered so that the data is sent first and then the header is sent second. Using the invention, the TCP module 32 of the sending node 22 only reads the data once, while it is being sent as a first internet datagram data fragment and the checksum is calculated during transmission of the first internet datagram data fragment. Then when the header is sent, the TCP module 32 of the sending node 22 already has the checksum information calculated for the data and inserts the checksum into the header that is sent as a second internet datagram header fragment. The IP module 34 of the receiving node 22 receives and reassembles the internet datagram without requiring architectural change or modification to the internet protocol. In other words, the receiving IP module 34 performs a conventional function of fragmentation reassembly. The IP module 34 of the receiving node 22 passes the checksum to the TCP module 32 for error checking. The method of the invention changes only the order of transmission of the data and TCP header fields of the conventional IP datagram to efficiently provide checksum error checking functions.

Figure 2:
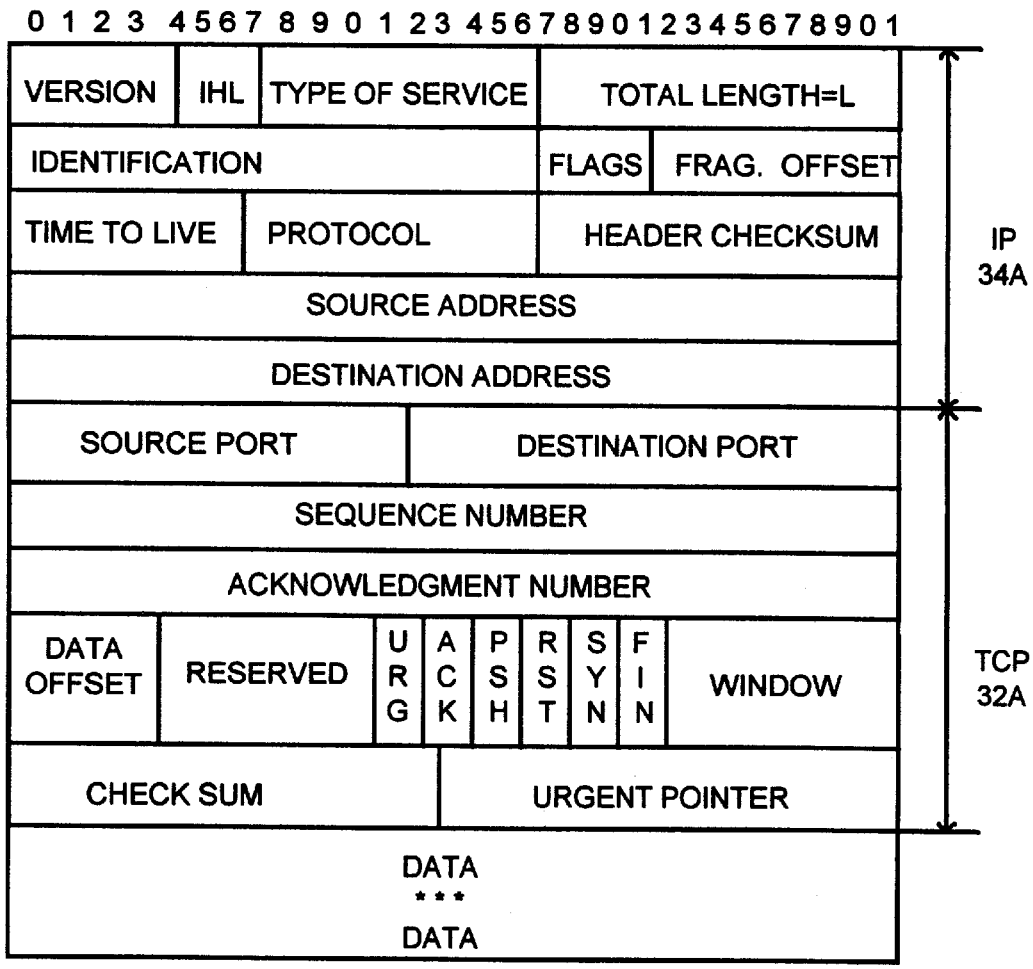
FIG. 2 is a block diagram representation illustrating an internet protocol (IP) packet including an IP header, a transmission communication protocol (TCP) header and data arranged in accordance with a conventional arrangement of an internet datagram.

FIG. 2 illustrates a standard internet protocol (IP) datagram or packet including an internet protocol (IP) header 34A, a transmission control protocol (TCP) header 32A and data. The TCP header 32A follows the internet header 34A, supplying information specific to the TCP protocol. The IP header 34A includes multiple information fields labeled VERSION, IHL, TYPE OF SERVICE, TOTAL LENGTH= L, IDENTIFICATION, FLAGS, FRAG. OFFSET, TIME TO LIVE, PROTOCOL, HEADER CHECKSUM, SOURCE ADDRESS, and DESTINATION ADDRESS.

The internet header length (IHL) field is the length of the internet header measured in 32 bit words. The time to live field of the IP header 34A indicates an upper bound on the lifetime of the internet datagram. The time to live is set by the sender of the datagram and reduced at the points along the route where the datagram is processed. If the time to live reaches zero before the internet datagram reaches its destination, the internet datagram is destroyed. The time to live provides a self destruct time limit or the maximum datagram lifetime.

The identification field of the IP header 34A carries the identifying value assigned by the sending TCP module 32 to aid in assembling the fragments of a datagram. The originating TCP module 32 of the sending computer system 22 sets the identification field to a value that must be unique for that source-destination pair and protocol for the time the datagram will be active in the internet system. The 13-bit fragment offset field indicates where in the internet datagram this fragment belongs. The 8-bit protocol field indicates the next level protocol used in the data portion of the internet datagram. The header checksum is a 16-bit field that provides a checksum for the header only. Since some header fields change with producing, such as the time to live field, the header checksum is recomputed and verified at each point that the internet header is processed. The header checksum field is the 16 bit one's complement of the one's complement sum of all 16 bit words in the IP header 34A. For purposes of computing the checksum, the value of the checksum field is zero. The four octet (32 bit) source and destination address fields consists of a network field and a local address field.

The TCP header 32A includes multiple information fields labeled SOURCE PORT, DESTINATION PORT, SEQUENCE NUMBER ACKNOWLEDGMENT NUMBER, DATA OFFSET, RESERVED, URG, ACK, PSH, RST, SYN, FIN, WINDOW, CHECKSUM, URGENT POINTER. A simplified description of both the TCP and IP headers 32A and 34A without the option fields is provided sufficient for the understanding of the present invention. The source and destination ports or addresses in the TCP and IP headers 32A and 34A provide the addresses for the sending and receiving computer systems 22. The 16-bit checksum field of the TCP header 32A is calculated during transmission of the first internet datagram data fragment. The TCP checksum is the 16 bit one's complement of the one's complement sum of all 16 bit words in the header and data.

Figure 3:
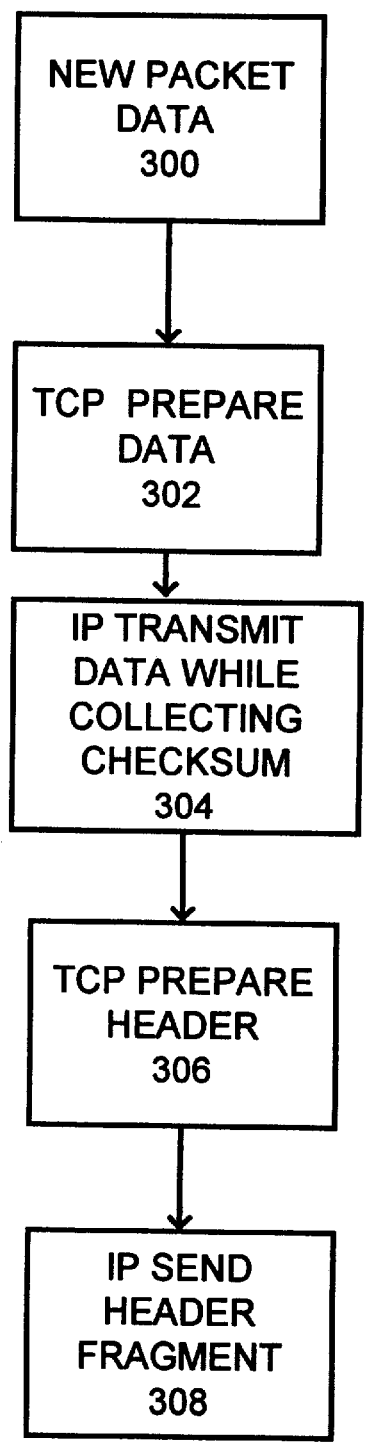
FIG. 3 is a flow chart illustrating an internet datagram transmission process of the present invention performed by a sending computer system.

FIG. 3 illustrates an internet datagram transmission process of the present invention performed by a sending computer system 22. First the TCP module 32 receives new packet data as indicated at a block 300. Then the TCP module 32 prepares the packet data for transmission as a first internet datagram data fragment as shown in FIG. 5 and calls the IP module 34 as indicated at a block 302. The IP module 34 transmits the first internet datagram data fragment while collecting checksum for the data as indicated at a block 304. Next the TCP module 32 prepares the packet header including the collected checksum or the internet datagram header fragment as shown in FIG. 6 for transmission last as indicated at a block 306. The IP module 34 transmits the internet datagram header fragment as indicated at a block 308 to complete the internet datagram transmission process of the present invention.

Referring to FIG. 4A, the flags of the IP header 34A are shown. Three-bits, labeled 0, DF and MF, of the IP flags define possible fragmentation for an internet datagram. Bit 0 of the IP flags field is reserved, and must be zero. The IP flag bits DF and MF represent don't fragment and more fragments, respectively. An internet datagram is marked don't fragment with the flag bit DF set to 1. Otherwise fragmentation of the internet datagram is allowed with the flag bit DF set 0. The more fragments flag bit MF is set to zero for the last fragment and is set to 1 for more fragments.

FIG. 4B illustrates a TCP pseudo header that is included in a checksum calculation. If the internet datagram data and header fragments contains an odd number of header and data octets to be checksummed, the last octet is padded on the right with zeros to form a 16 bit word for checksum purposes. The pad is not transmitted as part of the segment. While computing the checksum, the checksum field itself is replaced with zeros. The checksum also covers the 96 bit pseudo header conceptually prefixed to the TCP header. This pseudo header illustrated in FIG. 4B contains the source address, the destination address, the protocol, and TCP length. This gives the TCP protection against misrouted segments. This information is carried in the internet protocol and is transferred across the TCP/Network interface in the arguments or results of calls by the TCP module 32 on the IP module 34. The TCP length field is the length of the TCP header 32A plus the data length in octets. The TCP length is not an explicitly transmitted quantity, but is computed, and it does not count the 12 octets of the pseudo header.

The internet fragmentation and reassembly procedure allows breaking an internet datagram into a variable number of internet datagram fragments that can be later reassembled. The identification field is used to distinguish the fragments of one datagram from those of another. The receiving system 22 of the internet datagram fragments uses the identification field to distinguish fragments of different datagrams. To assemble the fragments of an internet datagram, an internet protocol module 34 of the receiving computer system 22 combines internet datagram fragments that have the same value for the four fields of identification, source, destination, and protocol.

Referring now to FIGS. 5 and 6, the two internet datagram data and header fragments are shown. FIG. 5 illustrates a first internet datagram data fragment that contain all of the data and is transmitted first across network 24. Because the TCP header 32A is not sent as part of this first internet datagram data fragment or first packet, the total length of the first IP packet is reduced by 20 bytes, as indicated by TOTAL LENGTH=L−20. The identification field is set to X so that the IP packet can be reassembled at the destination. The flags 010 indicate that this is the last fragment, and the nonzero fragment offset (20-bytes) tells the receiving node 22 that this is a fragmented IP packet. The fragment offset field tells the IP module 34 of the receiving computer system 22 the position of a fragment in the particular internet datagram. The fragment offset (20) and total length (L−20) fields determine the portion of the original datagram covered by this internet datagram fragment. The more fragments flag bit MF indicates that this is the last fragment of the internet datagram by being reset to 0. These fields of the IP header 34A of the internet datagram provide required information to reassemble fragmented internet datagrams.

FIG. 6 illustrates a second internet datagram header fragment that is transmitted last across network 24 after all of the data has been transmitted by one or more first internet datagram data fragments. The identification field is the Same X and the flags 011 indicate that the other fragments follow in the packet address space. The more fragments flag bit (MF) being set to one indicates that the datagram fragment is not the last fragment. The fragment offset field is set to zero which identifies the fragment location, relative to the beginning of the original unfragmented datagram. The total length of the second internet datagram header fragment is 40-bytes, as indicated by TOTAL LENGTH=40.

Referring to FIGS. 7A and 7B, the transmission method of the invention shown in FIG. 7B may be understood with respect to the conventional IP datagram transmission shown in FIG. 7A with respect to time. In accordance with the invention the conventional order of transmission is reversed so that the data fragment is sent first and then the header fragment is sent.

Figure 8:
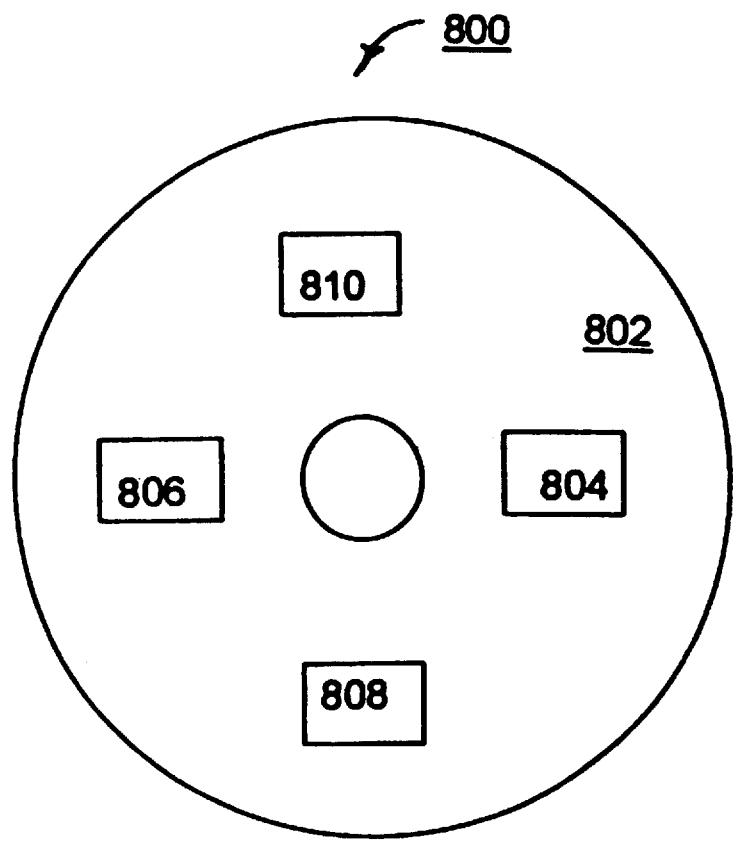
FIG. 8 is a block diagram illustrating a computer program product in accordance with the invention.

Referring now to FIG. 8, an article of manufacture or a computer program product 800 of the invention is illustrated. The computer program product 800 includes a recording medium 802, such as, a floppy disk, a high capacity read only memory in the form of an optically read compact disk or CD-ROM, a tape, a transmission type media such as a digital or analog communications link, or a similar computer program product. Recording medium 802 stores program means 804, 806, 808, 810 on the medium 802 for carrying out the methods of this invention in the system 20 of FIG. 1.

A sequence of program instructions or a logical assembly of one or more interrelated modules defined by the recorded program means 804, 806, 808, 810, direct the sending and receiving computer systems 22 to perform the transmission control protocol (TCP) checksums using internet protocol (IP) fragmentation of the invention.

While the present invention has been described with reference to the details of the embodiments of the invention shown in the drawing, these details are not intended to limit the scope of the invention as claimed in the appended claims.

What is claimed is:

1. A method for producing transmission control protocol (TCP) checksums using internet protocol (IP) fragmentation comprising the steps of:

receiving packet data to be transmitted and preparing a first internet protocol data fragment without a checksum for the received packet data; said first internet protocol data fragment including an internet protocol header, and said internet protocol header having a fragment offset value equal to a set value for a transmission control protocol (TCP) header and having a total length value reduced by said set value;

transmitting said first internet protocol data fragment to a receiving system and collecting checksum while transmitting said internet protocol data fragment; and after transmission of said first internet protocol data fragment, transmitting an internet protocol header fragment; said internet protocol header fragment including a modified internet protocol header and a transmission control protocol (TCP) header; said modified internet protocol header having a fragment offset value equal to zero and having a total length value equal to a total of said set value and a predetermined value for said internet protocol header; said transmission control protocol (TCP) header including said collected checksum.

2. A method for producing transmission control protocol (TCP) checksums as recited in claim 1 wherein said internet protocol header and said modified internet protocol header includes fields providing identification, source, destination, and protocol, and wherein the step of preparing said first internet protocol data fragment includes the step of setting an identification value for the first internet protocol data fragment and the internet protocol header fragment.

3. A method for producing transmission control protocol (TCP) checksums as recited in claim 1 wherein the step of preparing said first internet protocol data fragment includes the step of setting a predefined IP flag field to indicate fragmentation allowed.

4. A method for producing transmission control protocol (TCP) checksums as recited in claim 1 wherein the step of preparing said first internet protocol data fragment includes the step of setting a predefined IP flag field to indicate a last fragment.

5. A method for producing transmission control protocol (TCP) checksums as recited in claim 1 further includes the step of preparing said internet protocol header fragment.

6. A method for producing transmission control protocol (TCP) checksums as recited in claim 5 further includes the steps of setting a predefined IP flag field to indicate fragmentation allowed.

7. A method for producing transmission control protocol (TCP) checksums as recited in claim 5 further includes the steps of setting a predefined IP flag field to indicate not a last fragment.

8. Apparatus for producing transmission control protocol (TCP) checksums using internet protocol (IP) fragmentation comprising:

TCP means for receiving packet data to be transmitted and for preparing a first internet protocol data fragment without a checksum for the received packet data; said first internet protocol data fragment including an internet protocol header, and said internet protocol header having a fragment offset value equal to a set value for a transmission control protocol (TCP) header and having a total length value reduced by said set value;

IP means responsive to said TCP means for transmitting said first internet protocol data fragment to a receiving system and for collecting checksum while transmitting said internet protocol data fragment; and said TCP means including means responsive to said first internet protocol data fragment transmitted by said IP means for preparing an internet protocol header fragment and said IP means including means responsive to said TCP means for transmitting said internet protocol header fragment after transmission of said first internet protocol data fragment; said internet protocol header fragment including a modified internet protocol header and a transmission control protocol (TCP) header; said modified internet protocol header having a fragment offset value equal to zero and having a total length value equal to a total of said set value and a predetermined value for said internet protocol header; said transmission control protocol (TCP) header including said collected checksum.

9. A computer program product for use in a computer system having a processor that produces transmission control protocol (TCP) checksums using internet protocol (IP) fragmentation, the computer program product comprising:

a recording medium;

means, recorded on the recording medium, for receiving packet data to be transmitted and preparing a first internet protocol data fragment without a checksum for the received packet data; said first internet protocol data fragment including an internet protocol header, and said internet protocol header having a fragment offset value equal to a set value for a transmission control protocol (TCP) header and having a total length value reduced by said set value;

means, recorded on the recording medium, for transmitting said first internet protocol data fragment to a receiving system and collecting checksum while transmitting said internet protocol data fragment; and means, recorded on the recording medium, for transmitting an internet protocol header fragment after transmission of said first internet protocol data fragment; said internet protocol header fragment including a modified internet protocol header and a transmission control protocol (TCP) header; said modified internet protocol header having a fragment offset value equal to zero and having a total length value equal to a total of said set value and a predetermined value for said internet protocol header; said transmission control protocol (TCP) header including said collected checksum.

10. A computer program product as recited in claim 9 wherein said internet protocol header and said modified internet protocol header includes fields providing identification, source, destination, and protocol, and wherein said means, recorded on the recording medium, for preparing said first internet protocol data fragment includes means for setting an identification value for the first internet protocol data fragment and the internet protocol header fragment.

11. A computer program product as recited in claim 9 wherein said means, recorded on the recording medium, for preparing said first internet protocol data fragment includes means for setting a predefined IP flag field to indicate fragmentation allowed.

12. A computer program product as recited in claim 9 wherein said means, recorded on the recording medium, for preparing said first internet protocol data fragment includes means for setting a predefined IP flag field to indicate a last fragment.

13. A computer program product as recited in claim 9 further includes means, recorded on the recording medium, for preparing said internet protocol header fragment.

14. A computer program product as recited in claim 13 further includes means, recorded on the recording medium, for setting a predefined IP flag field to indicate fragmentation allowed.

15. A computer program product as recited in claim 13 further includes means, recorded on the recording medium, for setting a predefined IP flag field to indicate not a last fragment.

* * * * *